(12) United States Patent
Singarayan et al.

(10) Patent No.: US 10,911,351 B2
(45) Date of Patent: Feb. 2, 2021

(54) NETWORK AS A SERVICE USING VIRTUAL NODES

(71) Applicant: Juniper Networks, Inc., Sunnyvale, CA (US)

(72) Inventors: Babu Singarayan, San Jose, CA (US); Nitin Kumar, Fremont, CA (US); Javier Antich, Valencia (ES); Srikanth Subramanian, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 27 days.

(21) Appl. No.: 16/141,530

(22) Filed: Sep. 25, 2018

(65) Prior Publication Data

US 2020/0021522 A1 Jan. 16, 2020

(30) Foreign Application Priority Data

Jul. 13, 2018 (EP) .................................. 18382524

(51) Int. Cl.
*H04L 12/723* (2013.01)
*H04L 12/713* (2013.01)
(Continued)

(52) U.S. Cl.
CPC .......... *H04L 45/507* (2013.01); *H04L 45/586* (2013.01); *H04L 45/66* (2013.01); *H04L 49/25* (2013.01); *H04L 12/4641* (2013.01)

(58) Field of Classification Search
CPC ..... H04L 45/507; H04L 45/586; H04L 45/66; H04L 49/25; H04L 12/4641
(Continued)

(56) References Cited

U.S. PATENT DOCUMENTS 8,671,176 B1 3/2014 Kharitonov et al.
2011/0277027 A1* 11/2011 Hayton ............... H04L 63/0815
726/8
(Continued)

OTHER PUBLICATIONS

U.S. Appl. No. 15/844,338, filed Dec. 15, 2017, Juniper Networks, Inc. (inventor: Singarayan) entitled Connecting Virtual Nodes in a Network Device Using Abstract Fabric Interfaces.
(Continued)

*Primary Examiner* — Umar Cheema
*Assistant Examiner* — Tony Williams
(74) *Attorney, Agent, or Firm* — Shumaker & Sieffert, P.A.

(57) ABSTRACT

The techniques describe a network device comprising one or more processors configured to: receive configuration data configuring a plurality of virtual network nodes, wherein the configuration data configures a virtual client node including a corresponding line card having a port connected to a first customer network device, and configures a virtual core node including a corresponding line card having a port connected to a core network; provision a layer-2 (L2) circuit that includes, as an access interface, an interface logically connecting the virtual client node and virtual core node, wherein the L2 circuit provides connectivity between the virtual client node and a remote virtual client node; and forward, via the L2 circuit, packets between the virtual client node and the remote virtual client node to realize a logical network between the first customer network device and a second customer network device connected to the remote virtual PE node.

19 Claims, 4 Drawing Sheets

(51) Int. Cl.
    *H04L 12/721*     (2013.01)
    *H04L 12/947*     (2013.01)
    *H04L 12/46*     (2006.01)

(58) Field of Classification Search
    USPC .......................................................... 709/223
    See application file for complete search history.

(56) References Cited

U.S. PATENT DOCUMENTS

| | | | |
|---|---|---|---|
| 2014/0337500 A1* | 11/2014 | Lee | H04L 67/2866 |
| | | | 709/223 |
| 2015/0043382 A1 | 2/2015 | Arora et al. | |
| 2016/0203528 A1* | 7/2016 | Saha | G06Q 30/04 |
| | | | 705/34 |
| 2016/0216993 A1 | 7/2016 | Beckwith et al. | |
| 2018/0173557 A1* | 6/2018 | Nakil | G06F 9/45558 |

OTHER PUBLICATIONS

U.S. Appl. No. 16/024,306, filed Jun. 29, 2016, Juniper Networks, Inc. (inventor: Miriyala) entitled Extending Scalable Policy Management to Supporting Network Devices.

Extended Search Report from counterpart European Application No. 18382524.9, dated Dec. 5, 2018, 8 pp.

Response to Extended Search Report dated Dec. 5, 2018 from counterpart European Application No. 18382524.9, filed Jul. 15, 2020, 16 pp.

* cited by examiner

NETWORK AS A SERVICE USING VIRTUAL NODES

This application claims the benefit of EP Application no. EP18382524.9, filed Jul. 13, 2018. The entire contents of which is hereby incorporated by reference.

TECHNICAL FIELD

The disclosure relates to computer networks and, more specifically, to provisioning network services for customers of computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information so as to maintain an accurate representation of available routes through the network. A "route" can generally be defined as a path between two locations on the network. Upon receiving an incoming data packet, a router examines information within the packet, often referred to as a "key," to select an appropriate next hop to which to forward the packet in accordance with the routing information.

Node virtualization virtualizes a network device, which may include a single chassis, into multiple network nodes (virtual nodes, also called "node slices") by partitioning hardware resources of the network device among the virtual nodes. For example, node virtualization allows for partitioning a physical router into multiple virtual nodes. A virtual node is a combination of a control plane (routing plane) and a data plane (forwarding plane), with dedicated forwarding units assigned to the virtual node. The data planes are provided by one or more forwarding unit resources, and along with the associated control plane, the virtual nodes act as distinct routers. In some examples, control plane functionality of a virtual node may be provided by redundant control plane routing components executed by one or more server devices external to the router. In some cases, the redundant control plane routing components are executed by different physical server devices, separate from the router chassis and in communication with packet processors of the router via physical links.

SUMMARY

In general, this disclosure describes techniques for providing a network as a service using virtual nodes configured within at least one physical network device of a network. For example, in response to a customer request for a network device to provide network connectivity across two ends of a network, a service provider may allocate virtual nodes of at least one physical network device on those two ends to provide traffic isolation to the customer and provision end-to-end connectivity between the allocated virtual nodes. A network device may be virtualized (i.e., "sliced") into multiple virtual network nodes ("virtual nodes" or "vNodes") by apportioning hardware resources of the network device among the multiple virtual nodes. Within the multiple virtual nodes of a network device may be one or more virtual client nodes that provide connectivity to corresponding customer endpoints, and a virtual core node, e.g., shared uplink node, to provide connectivity for each of the virtual client nodes to a core network. An abstracted fabric (AF) interface may be configured to provide connectivity between a pair of virtual nodes, such as between a virtual client node and a virtual core node within a physical network device.

As described herein, at least one physical network device may be configured, e.g., by a controller, with multiple virtual nodes interconnected by at least one AF interface. Some of the virtual nodes, in turn, are configured with a Layer-2 (L2) circuit to interconnect the virtual nodes on different physical network devices, in which the L2 circuit traverses an AF interface configured between a virtual client node and a virtual core node of each of the physical network devices, thereby creating a separate network for allocation to a customer.

The techniques may provide one or more technical advantages. For example, by apportioning hardware resources such as line cards among different customers using virtual nodes and interconnecting virtual nodes using AF interfaces to realize an L2 circuit, the techniques may provide for virtual node and network isolation among customers, effectively providing a separate logical network per customer and/or per service between customer devices across the network. Separate logical networks per customer may enable, for example, fine-grained per-customer resource control and failure isolation over previous solutions in which services for different customers co-exist on the same hardware resources (e.g., the same line card).

The details of one or more examples of the techniques described herein are set forth in the accompanying drawings and the description below. Other features, objects, and advantages of the techniques described herein will be apparent from the description and drawings, and from the claims.

DETAILED DESCRIPTION

Figure 1:
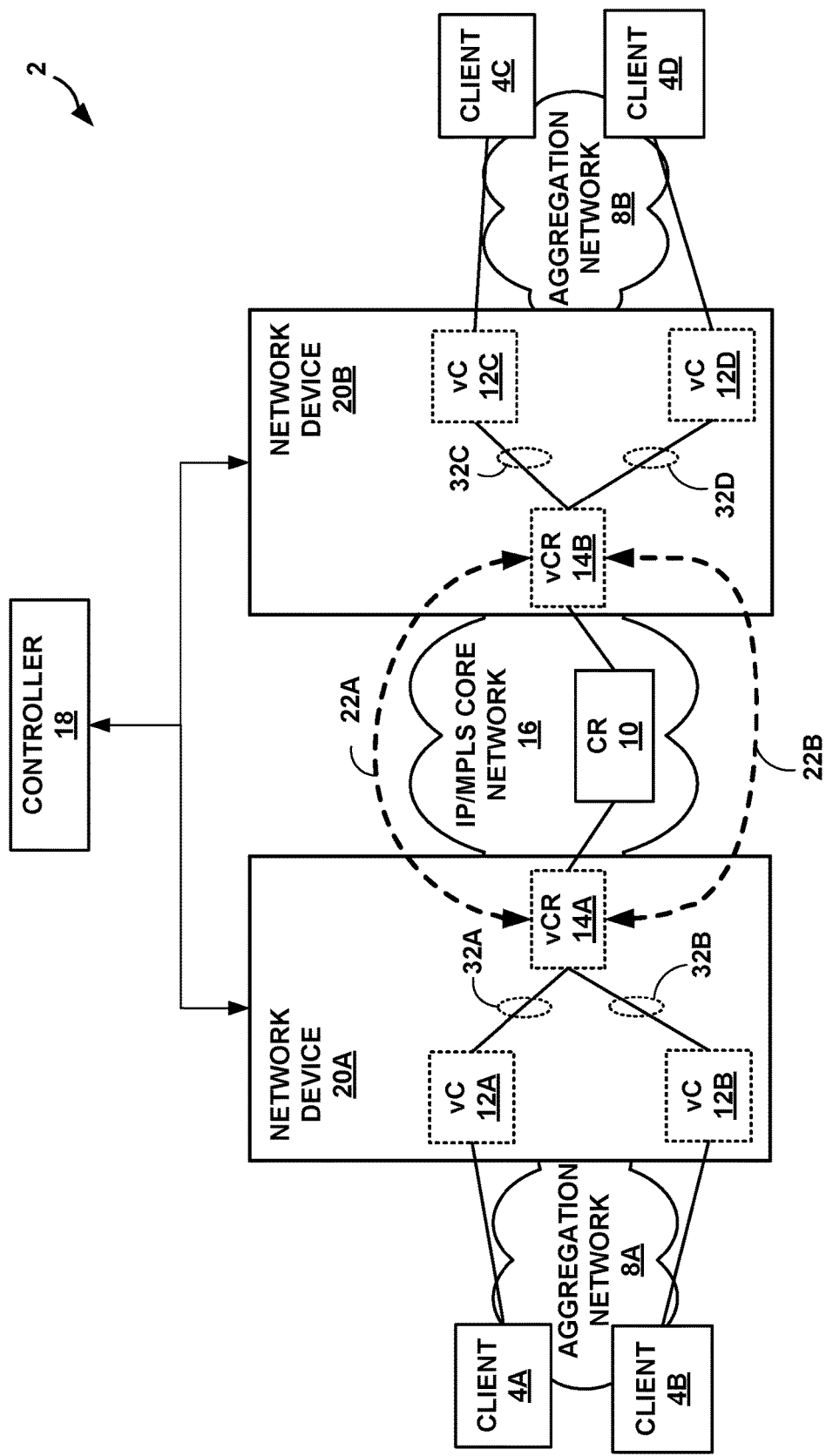
FIG. 1 is a block diagram illustrating an example network system that includes logical views of network devices configured in accordance with techniques described in this disclosure.

FIG. 1 is a block diagram illustrating an example network system 2 that includes logical views of network devices 20A-20B ("network devices 20") configured in accordance with techniques described in this disclosure. For purposes of example, the techniques of this disclosure are described with respect to a simplified network system 2 of FIG. 1 in which network devices 20A, 20B (e.g., routers) communicate with core router 10 ("core router 10") to provide connectivity for client devices 4A-4D ("client devices 4" or "customer devices 4") to access services provided by devices in Internet Protocol (IP)/Multi-Protocol Label Switching (MPLS) core network 16.

The configuration of network system 2 illustrated in FIG. 1 is merely an example. Although not illustrated as such, IP/MPLS core network 16 may be coupled to one or more networks administered by other providers, and may thus form part of a large-scale public network infrastructure, e.g., the Internet. Aggregation networks 8A, 8B ("aggregation networks 8") may represent a Metro Ethernet aggregation network, an Ethernet aggregation network, or an access network. In some examples of network system 2, client devices 4 may each connect to network device 20A using Point-to-Point Protocol (PPP), such as PPP over Ethernet (PPPoE). A service provider network may provide computing devices coupled to client devices 4 with access to the Internet, and may allow the computing devices within customer networks, e.g., client devices 4, to communicate with each other. In another example, IP/MPLS core network 16 may provide network services. In either case, IP/MPLS core network 16 may include a variety of network devices (not shown) other than network devices 20 and core router 10, such as additional routers, switches, servers, or other devices.

Client devices 4 may be devices coupled to one or more customer networks. In some examples, client devices 4 may represent computing devices, such as personal computers, laptop computers, handheld computers, workstations, servers, switches, printers, customer data centers or other devices, for example. In other examples, client devices 4 may represent endpoint devices (otherwise referred to as "access nodes" or "customer edge devices") such as a switch, a router, a gateway, or another terminal that operates as a demarcation point between customer equipment, such as subscriber devices, and service provider equipment. In one example, client devices 4 may comprise a digital subscriber line access multiplexer (DSLAM) or other switching device. For example, client devices 4 may be connected to one or more wireless radios or base stations (not shown) to wirelessly exchange packetized data with subscriber devices. Client devices 4 may comprise a switch, a router, a gateway, or another terminal that aggregates the packetized data received from the wireless radios. In some examples, aggregation networks 8 may each include an optical access network or cellular access network. For example, each of client devices 4 may comprise an optical line terminal (OLT) or optical network units (ONUs) via optical fiber cables. In some examples, client devices 4 may each include Broadband Remote Access Server (BRAS) functionality to aggregate output from one or more client devices 4 into a higher-speed uplink to an aggregation network. In the example of FIG. 1, client devices 4A and 4C may be managed and operated by one customer, and client devices 4B and 4D may be managed and operated by a different customer.

In the example of FIG. 1, the service provider network includes network devices 20 that are separate physical devices that may each be a single-chassis router having a single physical chassis. In some examples, network devices 20 may be geographically distributed network devices. Network devices 20 communicate with one another to provide connectivity for client devices 4 in the form of services. Network devices 20 may exchange routing information with core routers, e.g., core router 10, to maintain an accurate representation of the topology of network system 2. Network devices 20 may exchange routing information with one another using a routing protocol, such as Border Gateway Protocol (BGP) or an Interior Gateway Protocol such as Open Shortest Path First (OSPF) or Intermediate System-to-Intermediate System (IS-IS). Network devices 20 may signal service connections with one another using a label distribution protocol, such as Resource Reservation Protocol (RSVP) or Label Distribution Protocol (LDP).

As further described below, each of network devices 20 may implement node virtualization techniques. For example, network devices 20 may each be virtualized into multiple virtual nodes that are provided as a service to a customer. To virtualize network devices 20 into multiple vNodes, each of network devices 20 may apportion hardware resources of the network device. Each virtual node could serve the role of different network functions, such as Internet service provider edge, Virtual Private Network (VPN) service PE, and Multiprotocol Label Switching (MPLS) Label Switching Router (LSR). In some examples, a virtual node may be operating as, for example, virtual provider edge or virtual customer edge routers, virtual autonomous system border routers (ASBRs), virtual area border routers (ABRs), or another type of network device, such as a virtual switch. Each virtual node may include multiple routing components (e.g., routing processes) and packet processors of a forwarding component (otherwise referred to herein as "packet forwarding engines (PFEs)") that are physically coupled and configured to operate as separate logical routers. The virtual nodes are cooperative virtual routing components operating multiple distinct nodes from the perspective of network devices external to network devices 20. In some examples, control planes for any of the virtual nodes are offloaded to an external server. Further examples of node virtualization are provided in U.S. patent application Ser. No. 15/844,338, filed Dec. 15, 2017, the entire contents of which are incorporated by reference herein in its entirety.

In accordance with the techniques described herein, network devices 20 may each be virtualized (i.e., "sliced") into multiple independent virtual nodes that provide traffic isolation to a customer and provisions end-to-end connectivity between the virtual nodes. In the example of FIG. 1, a customer may request, e.g., via controller 18, for one or more network devices to interconnect client devices 4A and 4C. As one example, a customer may access controller 18 that may provide an interface for which a customer may request network devices as a service to interconnect client devices. Further examples of a controller are provided in U.S. patent application Ser. No. 16/024,306, filed Jun. 29, 2018, the entire contents of which are incorporated by reference herein in its entirety.

In response to a request for network devices to provide connectivity across IP/MPLS network 16, network devices 20 may each receive configuration data, e.g., from controller 18, that configures network devices 20 to allocate a plurality of virtual nodes. In some examples, controller 18 may convert the request into configuration data supported by network devices 20. The configuration data may include an intent-based policy that, for network devices 20, may cause network devices 20 to configure each of the allocated virtual nodes with a respective line card of network devices 20 for use by the virtual nodes to forward packets, and to provision end-to-end connectivity between the allocated virtual nodes, in accordance with the techniques described herein.

In the example of FIG. 1, network device 20A may configure, based on the configuration data, virtual client (vC) node 12A that includes a line card having a port connected to client device 4A. Similarly, network device 20B may configure, based on the configuration data, vC node 12C that includes a line card having a port connected to client device 4C.

The configuration data may also cause network devices 20 to configure virtual core (vCR) nodes 14A and 14B ("vCRs 14") (otherwise referred to herein as "shared uplink nodes"), respectively, to facilitate connectivity across the IP/MPLS core network 16 and to connect to one or more local virtual client nodes 12. For example, network device 20A may, based on the configuration data, configure vCR 14A that includes a line card having a port to connected to core router 10 of IP/MPLS core network 16. Similarly, network device 20B may, based on the configuration data, configure vCR 14B that includes a line card having a port connected to core router 10 of IP/MPLS core network 16.

Network devices 20 may be configured with an AF interface to logically connect the virtual core node with a local virtual client node. For example, network device 20A may be configured with AF interface 32A to connect vC 12A and vCR 14A, and network device 20B may be configured with AF interface 32C to connect vC 12C and vCR 14B. AF interfaces 32A and 32B may each operate as a first class Ethernet interface, and emulates, for example, a Wide Area Network (WAN) interface across a switch fabric of network device 20 interconnecting line cards of network device 20 (not shown in FIG. 1). AF interfaces 32A and 32B may facilitate routing control and management traffic between virtual nodes through the switch fabric. In the example of FIG. 1, AF interface 32A provides an L2 logical link construct that provides connectivity between vC 12A and vCR 14A. Similarly, AF interface 32C provides an L2 logical link construct that provides connectivity between vC 12C and vCR 14B. AF interfaces 32A and 32C each provides a single logical link connectivity between the vNodes, and could have many Layer-1, Layer-2, or Layer-3 fabric bundling within, depending on implementation.

To establish end-to-end connectivity for client devices 4A and 4C across IP/MPLS core network 16, network devices 20 may be configured, for example, by controller 18 with a L2 circuit between AF interfaces of vCR nodes 14. For example, network devices 20A and 20B may be configured with L2 circuit 22A, which is a point-to-point L2 connection over IP/MPLS core network 16 for tunneling L2 packets between vC 12A and vC 12C. Physical circuits with the same L2 encapsulations may be connected together across IP/MPLS core network 16. To generate L2 circuit 22A, peer virtual core nodes, e.g., vCR 14A and vCR 14B, may be configured to implement the same L2 protocol (e.g., Ethernet) and the same interior gateway protocol (IGP), such as Open Shortest Path First (OSPF) or Intermediate System-to-Intermediate System (IS-IS). vCR 14A and vCR 14B may also be configured with a symmetrical L2 configuration and belong to the same routing domain or autonomous system (i.e., having the same virtual circuit identifier). AF interfaces 32A and 32C may also be configured to support circuit cross-connect (CCC) interface encapsulations.

L2 circuit 22A may be transported over a virtual circuit, a point-to-point L2 connection that is transported over MPLS or other tunneling technology (e.g., Generic Route Encapsulation (GRE)) in IP/MPLS core network 16. Multiple virtual circuits may be transported over a single label switched path (LSP) between the shared uplink nodes, vCR 14A and vCR 14B, for network devices 20. An LSP for transporting virtual circuits may be established using LDP or RSVP. AF interfaces 32A and 32C may be configured as access interfaces to the virtual circuit for transporting L2 circuit 22A.

In response to configuring L2 circuit 22A between vCR 14A and vCR 14B as described above, vC 12A may receive a packet from client device 4A that is destined for client device 4C, and may send the packet from vC 12A to vC 12C using the L2 circuit 22A established between AF interface 32A of vCR 14A and AF interface 32C of vCR 14B. For example, an egress label advertised by vCR 14B (e.g., using LDP) may be used to identify the L2 circuit 22A at vCR 14B for forwarding L2 circuit 22A traffic on AF interface 32C to vC 12C. A packet labeled with the egress label is transported over an LSP or other tunnel to vCR 14B that is connected to vC 12C via AF interface 32C. In response to receiving the packet, vCR 14B may map the egress label to AF interface 32C and may forward the packet to vC 12C, which may forward the packet to client device 4C.

Similarly, vC 12C may receive a packet from client device 4C that is destined for client device 4A, and may send the packet from vC 12C to vC 12A over an ingress label advertised by vCR 14A (e.g., using LDP). The ingress label is transported over an LSP (LDP or RSVP) to vCR 14A that is connected to vC 12A. In response to receiving the packet, vC 12A may map the ingress label to AF interface 32A and may forward the packet to vC 12A, which may forward the packet to client device 4A.

In the example of FIG. 1, another customer may request, e.g., via controller 18, one or more network devices to interconnect client devices 4B and 4D. In response, network device 20A may receive configuration data, e.g., from controller 18, that configures vC 12B that includes a line card having a port connected to client device 4B. Similarly, network device 20B may configure vC 12D that includes a line card having a port connected to client device 4C. Although illustrated as configuring vC 12D on network device 20B, a virtual core node may be configured on any network device that may connect to client device 4D.

Network device 20A may be configured with AF interface 32B to connect vC 12B and vCR 14A, and network device 20B may be configured with AF interface 32D to connect vC 12D and vCR 14B.

To establish end-to-end connectivity for client device 4B and 4D across IP/MPLS core network 16, network devices 20 may be configured by controller 18 with L2 circuit 22B, which is a point-to-point L2 connection over IP/MPLS core network 16 for tunneling L2 packets between vC 12A and vC 12C. As described above, peer virtual core nodes, e.g., vCR 14A and vCR 14B, are configured to implement the same L2 protocol (e.g., Ethernet) and IGP protocol, and have a symmetrical L2 configuration and belong to the same routing domain or autonomous system. AF interfaces 32B and 32D may also be configured to support CCC interface encapsulations.

L2 circuit 22B may be transported over a virtual circuit, a point-to-point L2 connection that is transported over MPLS or other tunneling technology (e.g., GRE) in IP/MPLS core network 16. Multiple virtual circuits may be transported over a single LSP between the shared uplink nodes, vCR 14A and vCR 14B, for network devices 20. An LSP for transporting virtual circuits may be established using LDP or RSVP. AF interfaces 32B and 32D may be configured as access interfaces to the virtual circuit for transporting L2 circuit 22B.

In response to configuring L2 circuit 22B between AF interface 32B ofvCR 114A and AF interface 32D of vCR 14B as described above, vC 12B may receive a packet from client device 4B that is destined for client device 4D, and may send the packet from vC 12B to vC 12D using the L2 circuit 22B. For example, an egress label advertised by vCR 14B (e.g., using LDP) may be used to identify L2 circuit 22B at vCR 14B for forwarding L2 circuit 22B traffic on AF interface 32D to vC 12D. A packet labeled with the egress label is transported over an LSP or other tunnel to vCR 14B that is connected to vC 12D via AF interface 32D. In response to receiving the packet, vC 12D may map the egress label to AF interface 32D and may forward the packet to vC 12D, which may forward the packet to client device 4D.

Similarly, vC 12D may receive a packet from client device 4D that are destined for client device 4B, and may send the packets from vC 12D to vC 12B over an ingress label advertised by vCR 14A. The ingress label is transported over an LSP (LDP or RSVP) to vCR 14A that is connected to vC 12B. In response to receiving the packet, vC 12B may map the ingress label to AF interface 32B and may forward the packet to client device 4B, which may forward the packet to client device 4B.

Controller 18 may provide L3 addresses for the per-customer logical networks configured as described herein to the customers. For example, controller 18 may send to client device 4A an L3 address configured for vC 12A. Controller 18 may send to client device 4C an L3 address configured for vC 12B. The L3 addresses configured for vC 12A and vC 12B are different addresses.

In this way, the techniques may provide for virtual node isolation among customers, e.g., client devices 4A and 4B. For example, a service provider network may provide one customer with vC 12A and vC 12C including L2 circuit 22A that provides a separate logical network, and may provide another customer with vC 12B and vC 12D having L2 circuit 22B that provides another separate logical network. In this way, the separate logical networks for different customers may provide fine-grained per-customer resource control and failure isolation.

Figure 2:
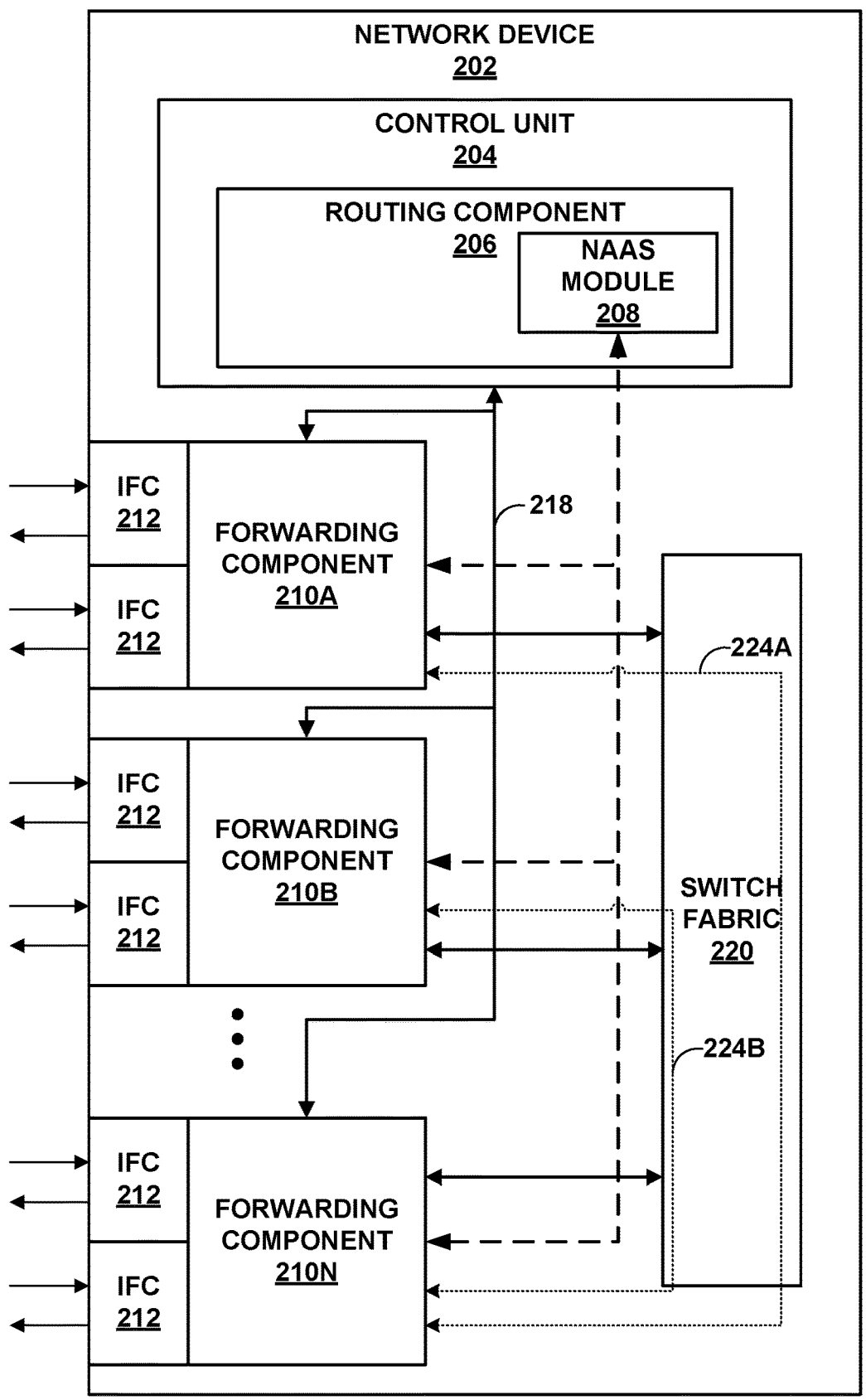
FIG. 2 is a block diagram illustrating an example network device, in accordance with the techniques described in this disclosure.

FIG. 2 is a block diagram illustrating an example network device 202, in accordance with the techniques described in this disclosure. Network device 202 may represent, for example, network device 20A of FIG. 1, but may similarly represent any of network devices 20 of FIG. 1.

In the example of FIG. 2, network device 202 includes a control unit 204 that provides control plane functionality for network device 202. Control unit 204 may be distributed among multiple entities, such as one or more routing components and one or more service cards insertable into network device 202. In such instances, network device 202 may therefore have multiple control planes. In some examples, each virtual routing node of network device 202 may have its own virtual control plane.

Control unit 204 may include a routing component 206 that provides control plane functions, storing network topology in the form of routing tables, executing routing protocols to communicate with peer routing devices, and maintaining and updating the routing tables. Routing component 206 also provides an interface (not shown) to allow user access and configuration of network device 202.

Network device 202 also includes a plurality of forwarding components in the form of example forwarding components 210A-210N ("forwarding components 210") and a switch fabric 220, that together provide a forwarding plane for forwarding and otherwise processing subscriber traffic. Forwarding components 210 may be, for example, any of vCs 12 and vCRs 14 of FIG. 1.

Control unit 204 is connected to each of forwarding components 210 by internal communication link 218. Internal communication link 218 may comprise a 100 Mbps or 1 Gbps Ethernet connection, for instance. Routing component 206 may execute daemons (not shown in FIG. 2), e.g., user-level processes that may run network management software, to execute routing protocols to communicate with peer routing devices, execute configuration commands received from an administrator, maintain and update one or more routing tables, manage subscriber flow processing, and/or create one or more forwarding tables for installation to forwarding components 210, among other functions.

Control unit 204 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 304 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Forwarding components 210 receive and send data packets via interfaces of interface cards 212 each associated with a respective one of forwarding components 210. Each of forwarding components 210 and its associated ones of IFCs 212 may reside on a separate line card (not shown) for network device 202. Example line cards include flexible programmable integrated circuit (PIC) concentrators (FPCs), dense port concentrators (DPCs), and modular port concentrators (MPCs). Each of IFCs 212 may include interfaces for various combinations of layer two technologies, including Ethernet, Gigabit Ethernet (GigE), and Synchronous Optical Networking (SONET) interfaces. In various aspects, each of forwarding components 210 may comprise more or fewer IFCs.

Switch fabric 220 provides a high-speed interconnect for forwarding incoming data packets to the selected one of forwarding components 210 for output over a network. Switch fabric 220 may include multiple fabric links (not shown). In some examples, switch fabric 220 may be a distributed, multi-stage switch fabric architecture, in which network packets traverse multiple stages of the switch fabric located in distributed forwarding components of the router to travel from an ingress point of the switch fabric to an egress point of the switch fabric. As one example, switch fabric 220 may be implemented as a single multi-stage Clos switch fabric, which relays communications across the stages of the switch fabric. A typical multi-stage Clos switch fabric has a plurality of switches interconnected to form a plurality of stages. In a typical arrangement, the switch fabric includes an ingress (or "first") stage, one or more intermediate stages, and an egress (or "final") stage, with each stage having one or more switches (e.g., crossbar switches-often referred to more simply as "crossbars"). Moreover, the switch fabric may be implemented such that the switches are arranged as multiple parallel fabric planes that each provide independent forwarding from ingress ports to egress ports through the multiple stages, one or more of which may be treated as a spare fabric plane. In other words, each of the parallel fabric planes may viewed as an independent portion of the multi-stage Clos switch fabric, where each plane provides switching redundancy.

Forwarding components 210 process packets by performing a series of operations on each packet over respective internal packet processing paths as the packets traverse the internal architecture of network device 202. Operations may be performed, for example, on each packet by any of a corresponding ingress interface, an ingress forwarding component, an egress forwarding component, an egress interface or other components of network device 202 to which the packet is directed prior, such as one or more service cards. The result of packet processing determines the way a packet is forwarded or otherwise processed by forwarding components 210 from its input interface on one of IFCs 212 to its output interface on one of IFCs 212.

In accordance with the techniques described herein, routing component 206 may include a Network as a Service (NaaS) module 208 that may allocate virtual nodes of network device 202 to provide traffic isolation to customers and provision end-to-end connectivity between allocated virtual nodes.

In one example, client devices 4A, 4C may request one or more network devices to provide network connectivity across the network. In this example, NaaS module 208 may receive, e.g., via a controller, configuration data that may cause network device 202 to allocate multiple virtual nodes, e.g., forwarding components 210A-210N. Network device 202 may be a router having a single physical chassis, which is virtualized into multiple virtual nodes by partitioning hardware resources of network device 202 (e.g., packet processors as further described and shown in FIG. 3) among the virtual nodes. Network device 202 includes multiple routing components (e.g., routing processes) and packet processors that are physically coupled and configured to operate as multiple independent, separate logical routers.

In one instance, NaaS module 208 may configure forwarding component 210A to operate as a virtual client node that is connected to client device 4A. For example, forwarding component 210A may reside in a respective line card of network device 202 having a port connected to client device 4A.

NaaS module 208 may also configure a virtual core node from the multiple virtual nodes. For instance, NaaS module 208 may configure forwarding component 210N to operate as a virtual core node. In this example, forwarding component 210N may reside in a respective line card having a port connected to a core network (e.g., IP/MPLS core network 16 of FIG. 1) that includes network device 202.

NaaS module 208 may also generate an L2 circuit ("first L2 circuit") that provides connectivity for forwarding component 210A (operating as a virtual core node) and a remote virtual core node of a remote network device (e.g., vC 12C of network device 20B of FIG. 1) via virtual core nodes. The first L2 circuit may include, as an access interface, an interface logically connecting forwarding component 210A and forwarding component 210N (operating as virtual core node). For example, the interface may include AF interface 224A that provides an L2 logical link construct that provides connectivity between forwarding component 210A and forwarding component 210N. To generate the first L2 circuit, NaaS module 208 may configure forwarding component 210N (operating as a virtual core node) and a remote virtual core node to implement the same L2 protocol (e.g., Ethernet) and the same IGP protocol (e.g., OSPF), include a symmetrical L2 configuration, and belong to the same routing domain or autonomous system (i.e., having the same virtual circuit identifier). AF interface 224A may also be configured to support CCC interface encapsulations. AF interface 224A may be an access interface for the first L2 circuit.

In response to configuring the first L2 circuit between AF interface 224A of forwarding component 210N and an AF interface of a remote virtual core node, forwarding component 210A (operating as a virtual client node) may operate as an ingress forwarding component of network device 202 and forward packets received (e.g., via one of IFCs 212) from client device 4A along the first L2 circuit. Alternatively, or additionally, forwarding component 210A may operate as an egress forwarding component of network device 202 and forward packets received from an internal processing path of network device 202 (e.g., via the first L2 circuit and from forwarding component 210N) to client device 4A.

Forwarding component 210N may operate as an egress forwarding component of network device 202 and forward packets received from the internal processing path of network device 202 (e.g., via the first L2 circuit and from forwarding component 210A) to the IP/MPLS core network 16 along the first L2 circuit. Alternatively, or additionally, forwarding component 210N may operate as an ingress forwarding component of network device 202 that receives packets from IP/MPLS core network 16 along the first L2 circuit and forwards the packets into an internal processing path toward forwarding component 210A, which in turn forwards the packet to client device 4A.

In some examples, client devices 4B and 4D may request one or more network devices to provide network connectivity across the network. In this example, NaaS module 208 may receive configuration data (e.g., via controller 18 of FIG. 1) that causes NaaS module 208 to configure a virtual client node that is isolated from forwarding component 210A configured for a different customer. In one instance, NaaS module 208 may configure forwarding component 210B to operate as a virtual client node that is connected to client device 4B. For example, forwarding component 210B may reside in a respective line card of network device 202 having a port connected to client device 4B.

NaaS module 208 may also generate a different L2 circuit (i.e., "second L2 circuit") that provides connectivity for forwarding component 210B (operating as a virtual client node) and a remote client node of a remote network device (e.g., vC 12D of network device 20B of FIG. 1). The second L2 circuit may include, as an access interface, an interface logically connecting forwarding component 210B and forwarding component 210N (operating as virtual core node). For example, the interface may include an AF interface 224B that provides an L2 logical link construct that provides connectivity between forwarding component 210B and forwarding component 210N. To generate the second L2 circuit, NaaS module 208 may configure forwarding component 210N and a remote virtual core node to implement the same L2 protocol (e.g., Ethernet) and the same IGP protocol (e.g., OSPF), include a symmetrical layer-2 configuration, and belong to the same routing domain or autonomous system (i.e., having the same virtual circuit identifier). AF interface 224B may also be configured to support CCC interface encapsulations. AF interface 224B may be an access interface for the second L2 circuit.

In response to configuring the second L2 circuit between AF interface 224B of network device 202 and an AF interface of the remote virtual core node, forwarding component 210B, operating as a virtual client node, may operate as an ingress forwarding component of network device 202 and forward packets received (e.g., via one of IFCs 212) from client device 4B along the second L2 circuit. Alternatively, or additionally, forwarding component 210B may operate as an egress forwarding component of network device 202 and forward packets received from an internal processing path of network device 202 (e.g., via the second L2 circuit and from forwarding component 210N) to client device 4B.

Forwarding component 210N may operate as an egress forwarding component of network device 202 and forward packets received from the internal processing path of network device 202 (e.g., via the second L2 circuit and from forwarding component 210B) to the IP/MPLS core network 16 along the second L2 circuit. Alternatively, or additionally, forwarding component 210N may operate as an ingress forwarding component of network device 202 that receives packets from IP/MPLS core network 16 along the second L2 circuit and forwards the packets into an internal processing path toward forwarding component 210B.

Figure 3:
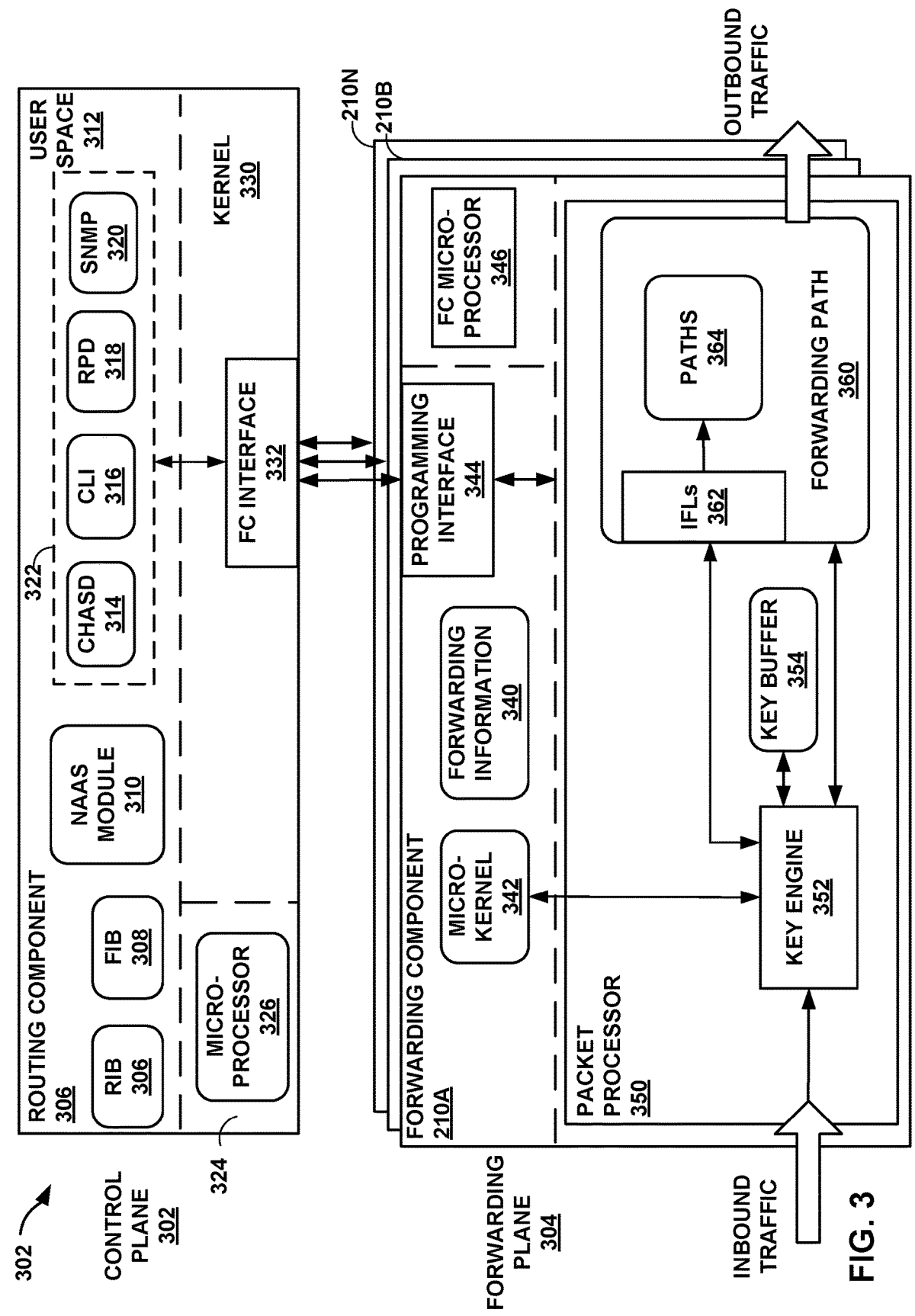
FIG. 3 is a block diagram illustrating components of the network device in further detail, in accordance with techniques described in this disclosure.

FIG. 3 is a block diagram illustrating example instances of routing component 206 and forwarding components 210 of routing engine 202 of FIG. 2 in further detail, in accordance with the techniques described herein. In this example, routing component 206 provides a control plane 302 operating environment for execution of various user-level daemons 322 executing in user space 312. Daemons 322 are user-level processes that may run network management software, execute routing protocols to communicate with peer routing devices, execute configuration commands received from an administrator, maintain and update one or more routing tables, manage subscriber flow processing, and/or create one or more forwarding tables for installation to forwarding components, e.g., forwarding component 210A, among other functions. In this example, daemons 322 include chassis daemon 314 ("CHASD 314"), command-line interface daemon 316 ("CLI 316"), routing protocol daemon 318 ("RPD 318"), and Simple Network Management Protocol daemon 320 ("SNMP 320"). In this respect, control plane 302 may provide routing plane, service plane, and management plane functionality for network device 202 of FIG. 2. Various instances of routing component 206 may include additional daemons 322 not shown in FIG. 3 that perform other control, management, or service plane functionality and/or drive and otherwise manage forwarding plane functionality for network device 202.

Daemons 322 operate over and interact with kernel 330, which provides a run-time operating environment for user-level processes. Kernel 330 may comprise, for example, a UNIX operating system derivative such as Linux or Berkeley Software Distribution (BSD). Kernel 330 offers libraries and drivers by which daemons 322 may interact with the underlying system. Forwarding component interface 332 ("FC interface 332") of kernel 330 comprises a kernel-level library by which daemons 322 and other user-level processes or user-level libraries may interact with programming interface 344 of forwarding component 210A. FC interface 332 may include, for example, a sockets library for communicating with forwarding component 210A over dedicated network links.

Hardware environment 324 of routing component 306 comprises microprocessor 326 that executes program instructions loaded into a main memory (not shown in FIG. 3) from storage (also not shown in FIG. 3) in order to execute the software stack, including both kernel 330 and user space 312, of routing component 206. Microprocessor 326 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

RPD 318 executes one or more interior and/or exterior routing protocols to exchange routing information with other network devices and store received routing information in routing information base 306 ("RIB 306"). For example, RPD 318 may execute protocols such as one or more of Interior Gateway Protocol (IGP) (such as Open Shortest Path First (OSPF) or Intermediate System-to-Intermediate System (IS-IS), Border Gateway Protocol (BGP), including interior BGP (iBGP), exterior BGP (eBGP), multiprotocol BGP (MP-BGP), Label Distribution Protocol (LDP), and Resource Reservation Protocol with Traffic-Engineering Extensions (RSVP-TE). RPD 318 may additionally, or alternatively, execute User Datagram Protocol (UDP) to send and receive data for various system resources, such as physical interfaces.

RIB 306 may include information defining a topology of a network, including one or more routing tables and/or link-state databases. RPD 318 resolves the topology defined by routing information in RIB 306 to select or determine one or more active routes through the network and then installs these routes to forwarding information base 308 ("FIB 308"). Typically, RPD 306 generates FIB 308 in the form of a radix or other lookup tree to map packet information (e.g., header information having destination information and/or a label stack) to next hops and ultimately to interface ports of interface cards associated with respective forwarding component 210A. Kernel 330 may synchronize FIB 308 of routing component 306 with forwarding information 340 of forwarding component 210A.

Command line interface daemon 316 ("CLI 316") provides a shell by which an administrator or other management entity or user may modify the configuration of network device 202 using text-based commands. SNMP 220 comprises an SNMP agent that receives SNMP commands from a management entity to set and retrieve configuration and management information for network device 202. Using CLI 316 and SNMP 320, for example, management entities may enable/disable and configure services, manage classifications and class of service for packet flows, install routes, enable/disable and configure rate limiters, configure traffic bearers for mobile networks, enable/disable an aggregated interface (e.g., abstracted fabric interface), and configure interfaces, for example. RPD 318, CLI 316, and SNMP 320 in this example configure forwarding plane 304 via FC interface 332 to implement configured services, and/or add/modify/delete routes. FC interface 332 allows daemons 322 to drive the installation and configuration of virtual client nodes and a virtual core node of forwarding components 210A.

NaaS module 310 may be configured to facilitate the allocation of virtual nodes and the configuration of end-to-end connectivity among the virtual nodes. In some examples, NaaS 310 may receive a request from an external (or internal) controller to configure virtual nodes within network device 202 that are provided as a service for a customer.

Forwarding component 210A, in combination with other forwarding components of network device 202 (e.g., forwarding component 210N), implements forwarding plane 304 (also known as a "data plane") functionality to handle packet processing from ingress interfaces on which packets are received to egress interfaces to which packets are sent. Forwarding plane 304 determines data packet forwarding through network device 202, applies services, rate limits packet flows, filters packets, and otherwise processes the packets using service objects and lookup data installed by control plane 302 to forwarding plane 304. Forwarding component 210A may operate as a virtual client node and forwarding component 210N may operate as a virtual core node, in accordance with the techniques described herein. Although FIG. 3 illustrates only forwarding component 210A in detail, each of forwarding components 210 of network device 202 comprises similar modules that perform substantially similar functionality.

Forwarding component 210A includes packet processor PP 350 ("PP 350"). Packet processor 350 may include, e.g., application-specific integrated circuit based packet processors ("ASICs") or any packet forwarding engine that executes the techniques described herein. Packet processor 350 includes one or more programmable application-specific integrated circuits having a key engine 352 that executes microcode (or "microinstructions") to control and apply fixed hardware components of PP 350 to process packet "keys." A packet key includes packet fields and other parameters that determine a flow of packet processing for the packet along an internal processing path, such as paths 464. In some examples, key engine 352 includes a key buffer 354 to store packet field data for corresponding packets that the key engine is currently processing. Key buffer 354 may also provide limited writable memory to which elements of the internal processing path may write to pass messages accessible by future elements. Some instances of PP 350 may include a plurality of key engines each having an associated key buffer.

Internal forwarding path 360 ("forwarding path 360") of PP 350 comprises programmable, executable microcode and fixed hardware components that determine the packet processing actions and other operations performed by key engine 352. PP 350 may store executable instructions of processing path 360 in computer-readable storage media, such as static random access memory (SRAM). While illustrated within PP 350, in some examples executable instructions of forwarding path 360 may be stored in memory external to PP 350 in forwarding component 210A.

In some aspects, forwarding path 360 includes a next hop data structure to initiate processing. At the end of each processing step by key engine 352, the result is a next hop that may specify additional processing or the termination of processing, for instance. In addition, next hops may specify one or more functions to be executed by key engine 352 and/or one or more hardware elements to be applied (e.g., policers). Key engine 352 may be associated with a result (or "lookup") buffer (not shown) that stores results for executing next hops. For example, key engine 352 may execute a lookup specified by a list of next hops and store the result of the lookup to the associated result buffer. The contents of a result buffer may affect the actions of the next hop.

Logical interfaces 362 ("IFLs 362") is a table or other data structure that includes one or more logical interfaces. Each of IFLs 362 is an interface to a forwarding path of paths 364. Paths 364 represents one or more forwarding paths for execution by key engine 352 on key buffer 354. For example, paths 364 may include a path along an L2 circuit to provide a service at the port of forwarding component 210A that is connected to a customer network device (e.g., client device 4A of FIG. 1), in accordance with the techniques described herein.

Forwarding component microprocessor 346 ("FC microprocessor 346") manages PP 350 and executes programming interface 344 to provide an interface for/to routing component 206. Programming interface 344 may comprise one or more user- or kernel-level libraries, programs, toolkits, application programming interfaces (APIs) and may communicate control and data messages to forwarding component 210A via internal communication link (e.g., communication link 218 of FIG. 3) using sockets, for example. FC microprocessor 346 may execute a microkernel 342 to provide an operating environment for interfaces. Programming interface 344 receives messages from routing component 206 directing forwarding component 210A to configure logical interfaces 362.

In operation, NaaS module 310 of routing component 206 may receive, for example, a request to provide end-to-end connectivity to client devices (e.g., client devices 4A, 4C of FIG. 1) associated with customer networks. NaaS module 310 may instruct network device 202 to apportion hardware resources of network device 202 into multiple virtual nodes, e.g., forwarding components 210A-210N. NaaS module 310 may use daemons 322 to drive the installation and configuration of forwarding component 210A, via FC interface 332, to operate as a virtual client node (e.g., vC 12A of FIG. 1) and forwarding component 210N to operate as a virtual core node (e.g., vCR 14A of FIG. 1). NaaS module 310 may also use chassis daemon 314 to configure an abstracted fabric interface that logically connects forwarding component 210A and forwarding component 210N.

NaaS module 310 may generate an L2 circuit that includes the AF interface that logically connects forwarding component 210A and forwarding component 210N. For example, NaaS module 310 may configure forwarding component 210N (operating as virtual core node) to implement the same IGP protocol and layer 2 protocol (e.g., Ethernet), include a symmetrical layer-2 configuration, and belong to the same routing domain or autonomous system (i.e., having the same virtual circuit identifier) as a remote virtual core node (e.g., vCR 14B of FIG. 1) of a remote network device (e.g., network device 20B of FIG. 1). The AF interface that logically connects forwarding component 210A and forwarding component 210N may also be configured to support CCC interface encapsulations.

In response to the above configuration, NaaS module 310 may trigger RPD 318 to execute protocols such as LDP such that forwarding component 310N may advertise ingress and egress labels to enable forwarding component 210A to forward traffic, based on the advertised labels, between client device 4A (that is connected to a port of forwarding component 210A) and the IP/MPLS core network 16 (that is connected to a port of forwarding component 210N).

In response to advertising the ingress and egress labels, NaaS module 310 may use forwarding component interface 332 to map packet flows from forwarding component 210A to the abstracted fabric interface that logically connects forwarding component 210A and forwarding component 210N for forwarding to the IP/MPLS core network via forwarding component 210N. For example, NaaS module 310 may use chassis daemon 314 to establish a point-to-point L2 connection between the AF interface between forwarding component 210A operating as a virtual client node and forwarding component 210N operating as a virtual core node, and an AF interface of a remote forwarding component operating as a remote virtual core node (e.g., vCR 14B) to realize a logical network between client devices. For example, NaaS module 310 may use chassis daemon 314 to configure forwarding component 210N as a next hop for forwarding component 210A, and configure a network device of the IP/MPLS core network as a next hop for the forwarding component 210N. Alternatively, or additionally, NaaS module 310 may use chassis daemon 314 to configure forwarding component 210A as a next hop for forwarding component 210N for packets received over the IP/MPLS core network. In this way, forwarding component 210A may receive a packet from client device 4A that is destined for client device 4C, and may send the packet from forwarding component 210A to forwarding component 210N (i.e., with an egress label advertised by vCR 14B), which in turn sends the packet along the L2 circuit to IP/MPLS core network 16 with the egress label towards the remote virtual client node that is connected to client device 4C.

In some examples, NaaS module 310 may receive, for example, a request to provide end-to-end connectivity to client devices (e.g., client devices 4B, 4D of FIG. 1) of customer networks of a second customer. Using the techniques described above, NaaS module 310 may configure forwarding component 210B to operate as a virtual client node that is isolated from forwarding component 210A. NaaS module 310 may also use chassis daemon 314 to configure a second abstracted fabric interface that logically connects forwarding component 210B and forwarding component 210N.

NaaS module 310 may generate an L2 circuit that includes the AF interface that logically connects forwarding component 210B and forwarding component 210N. For example, NaaS module 310 may configure forwarding component 210N (operating as virtual core node) to implement the same IGP protocol and layer 2 protocol (e.g., Ethernet), include a symmetrical layer-2 configuration, and belong to the same routing domain or autonomous system (i.e., having the same virtual circuit identifier) as a remote virtual core node (e.g., vCR 14B of FIG. 1) of a remote network device (e.g., network device 20B of FIG. 1). The AF interface that logically connects forwarding component 210B and forwarding component 210N may also be configured to support CCC interface encapsulations.

In response to the above configuration, NaaS module 310 may trigger RPD 318 to execute protocols such as LDP such that forwarding component 310N may advertise ingress and egress labels to enable forwarding component 210B to forward traffic, based on the advertised labels, between client device 4B (that is connected to a port of forwarding component 210B) and the IP/MPLS core network 16 (that is connected to a port of forwarding component 210N).

In response to advertising the ingress and egress labels, NaaS module 310 may use forwarding component interface 332 to map packet flows from forwarding component 210B to the abstracted fabric interface that logically connects forwarding component 210B and forwarding component 210N for forwarding to the IP/MPLS core network via forwarding component 310N. For example, NaaS module 310 may use chassis daemon 314 to establish a point-to-point L2 connection between forwarding component 210N operating as a virtual core node and a remote forwarding component operating as a remote virtual core node (e.g., vCR 14A) to realize a logical network between client devices. For example, NaaS module 310 may use chassis daemon 314 to configure forwarding component 210N as a next hop for forwarding component 210B, and configure a network device of the IP/MPLS core network as a next hop for the forwarding component 210N. Alternatively, or additionally, NaaS module 310 may use chassis daemon 314 to configure forwarding component 210B as a next hop for forwarding component 210N for packets received over the IP/MPLS core network. In this way, forwarding component 210B may receive a packet from client device 4B that is destined for client device 4D, and may send the packet from forwarding component 210B to forwarding component 210N (i.e., with an egress label advertised by vCR 14B), which in turn sends the packet along the L2 circuit to IP/MPLS core network 16 with the egress label towards the remote virtual client node that is connected to client device 4D.

Figure 4:
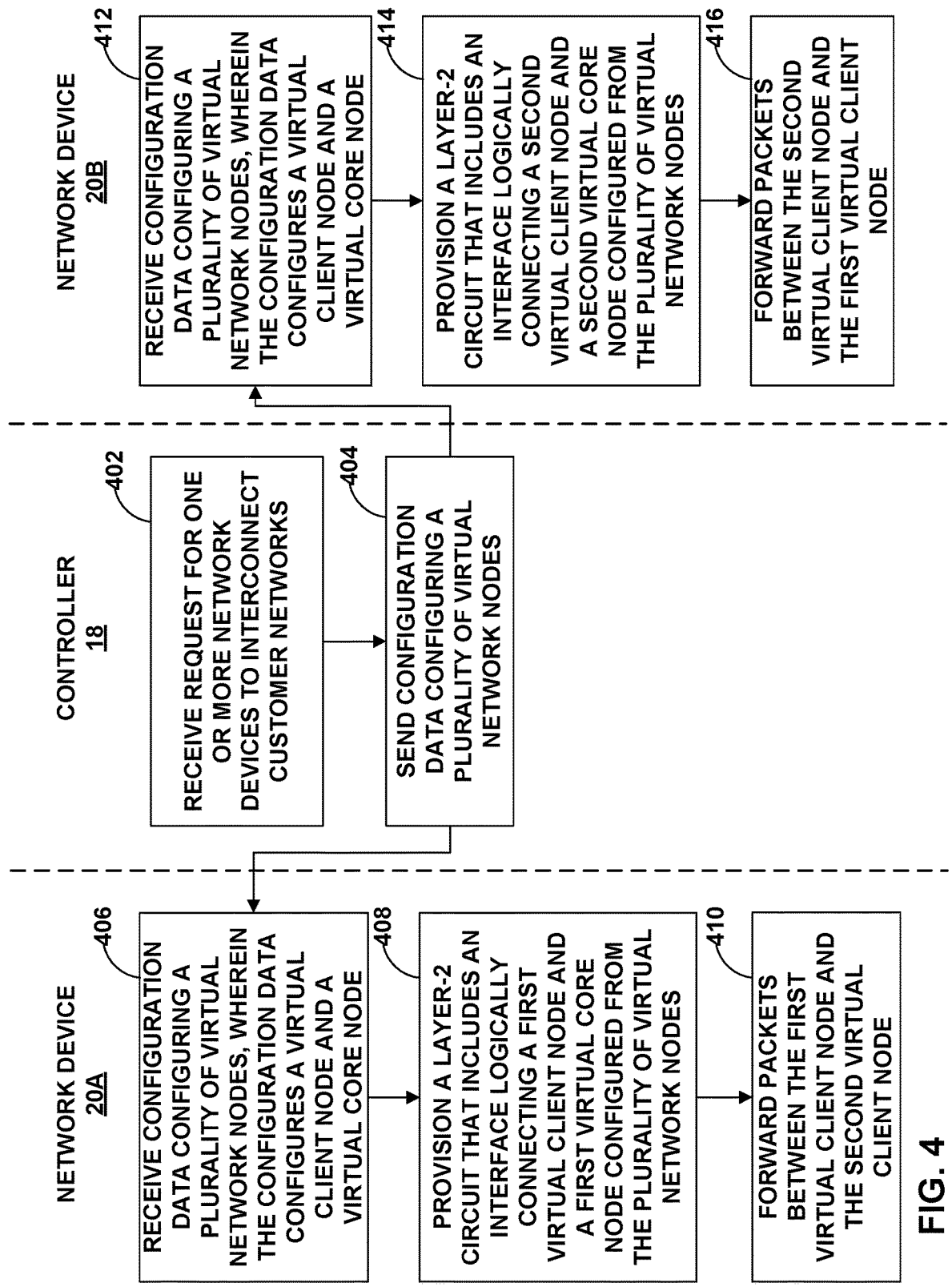
FIG. 4 is a flowchart illustrating an example operation of network devices, in accordance with techniques described in this disclosure.

FIG. 4 is a flowchart illustrating an example operation of network devices, in accordance with the techniques described in this disclosure. FIG. 4 is described for purposes of example with respect to network devices 20 of FIG. 1.

In the example of FIG. 4, controller 18 may receive a request for one or more network devices to interconnect customer networks (402). For example, controller 18 may provide an interface for which a customer may request to for one or more network devices to interconnect client devices 4A and 4C. Controller 18 may send configuration data configuring a plurality of virtual network nodes (404).

Network device 20A may receive the configuration data configuring a plurality of virtual network nodes (406). For example, the configuration data may cause network device 20A to be virtualized into multiple virtual nodes by apportioning hardware resources of network device 20A. The configuration data may configure each of the virtual nodes with a respective line card of network device 20A for use by the virtual node to forward packets. The configuration data may also configure a first virtual client node, e.g., vC 12A, from the virtual nodes such that a line card of vC 12A has a port that is connected to client device 4A. The configuration data may also configure a first virtual core node, e.g., vCR 14A, from the virtual nodes such that a line card of vCR 14A has a port that is connected to IP/MPLS core network 16.

Network device 20A may provision an L2 circuit that includes an interface logically connecting the first virtual client node (e.g., vC 12A) and the first virtual core node (e.g., vCR 14A) (408). For example, the L2 circuit may include an AF interface that interconnects the first virtual client node and the first virtual core node. As one example, vCR 14A may be configured to implement the same IGP protocol and layer 2 protocol (e.g., Ethernet), include a symmetrical layer-2 configuration, and belong to the same routing domain or autonomous system (i.e., having the same virtual circuit identifier) as a remote virtual core node (e.g., vCR 14B) of a remote network device (e.g., network device 20B). The AF interface (e.g., AF interface 32A) that logically connects vC 12A and vCR 14A may also be configured to support CCC interface encapsulations. In this way, network device 20A may configure an L2 circuit that includes AF interface 32A that provides connectivity between client device 4A and IP/MPLS core network 16.

In some examples, controller 18 may, in response to allocating virtual nodes and provisioning end-to-end connectivity between the allocated virtual nodes, provide L3 addresses for client devices 4. For example, controller 18 may send an L3 address configured for vC 12A to client device 4A. The L3 address configured for vC 12A is different from an L3 address configured for vC 12B, as further described below.

Network device 20A may forward, via the L2 circuit, packets between a first virtual client node (e.g., vC 12A) and a remote virtual client node (e.g., vC 12C, referred to as "second virtual client node") (410). For example, vC 12A may receive a packet from client device 4A that is destined for client device 4C, and may send the packet from vC 12A to vCR 14A (i.e., with an egress label advertised by vCR 14B), which in turn sends the packet along the L2 circuit to IP/MPLS core network 16 with the egress label. In response to receiving the packet, vC 12C of network device 20B may map the egress label to AF interface 32C and may forward the packet to vC 12C, which may forward the packet to client device 4C.

In some examples, network device 20B may receive a second configuration data configuring a plurality of virtual network nodes (412). For example, the second configuration data may cause network device 20B to be virtualized into multiple virtual nodes by apportioning hardware resources of network device 20B. The configuration data may configure each of the virtual nodes with a respective line card of network device 20B for use by the virtual node to forward packets. The configuration data may also configure a second virtual client node, e.g., vC 12C, from the virtual nodes such that a line card of vC 12C has a port that is connected to client device 4C. The configuration data may also configure a second virtual core node, e.g., vCR 14B, from the virtual nodes such that a line card of vCR 14B has a port that is connected to IP/MPLS core network 16.

Network device 20B may provision the L2 circuit that includes an interface logically connecting the second virtual client node (e.g., vC 12C) and the second virtual core node (e.g., vCR 14B) (414). For example, the L2 circuit may include an AF interface that interconnects the second virtual client node and the second virtual core node. As one example, vCR 14B may be configured to implement the same IGP protocol and layer 2 protocol (e.g., Ethernet), include a symmetrical layer-2 configuration, and belong to the same routing domain or autonomous system (i.e., having the same virtual circuit identifier) as vCR 14A of network device 20A. The AF interface (e.g., AF interface 32C) that logically connects vC 12A and vCR 14A may also be configured to support CCC interface encapsulations. In this way, network device 20B may configure an L2 circuit that includes AF interface 32C that provides connectivity between client device 4C and IP/MPLS core network 16.

In some examples, controller 18 may, in response to allocating virtual nodes and provisioning end-to-end connectivity between the allocated virtual nodes, provide L3 addresses for client device 4B. For example, controller 18 may send an L3 address configured for vC 12B to client device 4B. The L3 address configured for vC 12B is different from the L3 address configured for vC 12A (as described above).

Network device 20B may forward, via the L2 circuit, packets between a second virtual client node (e.g., vC 12C) and a remote virtual client node (e.g., vC 12A) (416). For example, vC 12C may receive a packet from client device 4C that is destined for client device 4A, and may send the packet from vC 12C to vCR 14B (i.e., with an ingress label advertised by vCR 14A), which in turn sends the packet along the L2 circuit to IP/MPLS core network 16 with the ingress label. In response to receiving the packet, vC 12A of network device 20A may map the ingress label to AF interface 32A and may forward the packet to vC 12A, which may forward the packet to client device 4A.

In some examples in which a second customer (e.g., client device 4B), requests a network device to provide connectivity across IP/MPLS core network 16, the configuration data may also configure a third virtual client node, e.g., vC 12B, that is isolated from vC 12A, and a second, separate, L2 circuit (e.g., L2 circuit 22B) that includes an interface logically connecting the third virtual client node and the first virtual core node.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A system comprising:
   a controller comprising one or more processors configured to receive a request to provide connectivity across a network;
   a first network device configured to:
      receive, from the controller, first configuration data configuring a plurality of virtual network nodes within the first network device to operate as separate logical routers, wherein the plurality of virtual network nodes within the first network device comprises:
         a first virtual client node including a corresponding line card that has a port connected to a first customer network device, and a first virtual core node including a corresponding line card that has a port connected to a core network;
provision an access interface within the first network device for a layer-2 (L2) circuit to logically connect the first virtual client node and the first virtual core node across a first switch fabric interconnecting the corresponding line card of the first virtual client node and the corresponding line card of the first virtual core node; and a second network device configured to:
receive, from the controller, second configuration data configuring a plurality of virtual network nodes within the second network device, wherein the plurality of virtual network nodes within the second network device comprises:
a second virtual client node including a corresponding line card that has a port connected to a second customer network device;
a second virtual core node including a corresponding line card that has a port connected to the core network,
provision an access interface within the second network device for the L2 circuit to logically connect the second virtual client node and the second virtual core node,
wherein the L2 circuit provides connectivity between the first virtual client node and the second virtual client node across a second switch fabric interconnecting the corresponding line card of the second virtual client node and the corresponding line card of the second virtual core node,
wherein the first network device and the second network device are configured to forward, via the L2 circuit, packets between the first virtual client node and the second virtual client node to realize a logical network between the first customer network device and the second customer network device.

2. The system of claim 1,
wherein the L2 circuit comprises a first L2 circuit,
wherein the access interface within the first network device comprises a first access interface within the first network device;
wherein the access interface within the second network device comprises a first access interface within the second network device;
wherein the plurality of virtual network nodes within the first network device further comprises a third virtual client node including a corresponding line card having a port connected to a third customer network device,
wherein the first network device is further configured to:
provision a second access interface within the first network device for a second L2 circuit to logically connect the third virtual client node and the first virtual core node across the first switch fabric, the first switch fabric interconnecting the corresponding line card of the third virtual client node and the corresponding line card of the first virtual core node,
wherein the plurality of virtual network nodes within the second network device further comprises a fourth virtual client node including a corresponding line card having a port connected to a fourth customer network device,
wherein the second network device is further configured to:
provision a second access interface within the second network device for the second L2 circuit to logically connect the fourth virtual client node and the second virtual core node across the second switch fabric, the second switch fabric interconnecting the corresponding line card of the fourth virtual client node and the corresponding line card of the second virtual core node, wherein the second L2 circuit provides connectivity between the third virtual client node and the fourth virtual client node, and
wherein the first network device and the second network device are configured to forward, via the second L2 circuit, packets between the third virtual client node and the fourth virtual client node to realize a second logical network between the third customer network device and the fourth customer network device.

3. The system of claim 2, wherein the first L2 circuit is separate from the second L2 circuit.

4. The system of claim 2, wherein the first virtual client node is isolated from the second virtual client node.

5. The system of claim 1,
wherein the access interface within the first network device comprises a first abstracted fabric interface that provides a layer 2 link between the corresponding line card of the first virtual client node and the corresponding line card of the first virtual core node, and
wherein the interface within the second network device comprises a second abstracted fabric interface that provides a layer 2 link between the corresponding line card of the second virtual client node and the corresponding line card of the second virtual core node.

6. The system of claim 1, wherein the controller is further configured to:
send, in response to provisioning the first L2 circuit, a first network address of the first virtual client node to the first customer network device and a second network address of the second virtual client node to the second customer network device.

7. A method comprising:
receiving, by a first network device, configuration data to configure a plurality of virtual network nodes within the first network device to operate as separate logical routers,
wherein the configuration data causes the first network device to configure a first virtual client node from the plurality of virtual network nodes including a corresponding line card that has a port connected to a first customer network device,
wherein the configuration data causes the first network device to configure a first virtual core node from the plurality of virtual network nodes including a corresponding line card that has a port connected to a core network that includes the first network device;
provisioning, by the first network device, an access interface within the first network device for a Layer-2 (L2) circuit to logically connect the first virtual client node and the first virtual core node across a first switch fabric interconnecting the corresponding line card of the first virtual client node and the corresponding line card of the first virtual core node, wherein the L2 circuit provides connectivity between the first virtual client node and a remote client node of a second network device that is remote to the first network device; and
forwarding, by the first network device and via the L2 circuit, packets between the first virtual client node and the remote client node to realize a logical network between the first customer network device and a second customer network device connected to the remote client node.

8. The method of claim 7, wherein the remote client node comprises a second virtual client node.

9. The method of claim 7, wherein the configuration data comprises a first configuration data, and wherein the remote client node comprises a second virtual client node, the method further comprising:
receiving, by the second network device, second configuration data to configure a plurality of virtual network nodes within the second network device to operate as separate logical routers,
wherein the second configuration data causes the second network device to configure the second virtual client node from the plurality of virtual network nodes including a corresponding line card that has a port connected to the second customer network device,
wherein the second configuration data causes the second network device to configure a second virtual core node from the plurality of virtual network nodes including a corresponding line card for that has a port connected to the core network that includes the second network device;
provisioning, by the second network device, an access interface within the second network device for the L2 circuit to logically connect the second virtual client node and the second virtual core node across a second switch fabric interconnecting the corresponding line card of the second virtual client node and the corresponding line card of the second virtual core node, wherein the L2 circuit provides connectivity between the first virtual client node and the second virtual client node; and
forwarding, by the second network device and via the L2 circuit, packets between the second virtual client node and the first virtual client node to realize the logical network between the second customer network device and the first customer network device.

10. The method of claim 9,
wherein the access interface within the first network device comprises a first abstracted fabric interface that provides a Layer-2 link between the corresponding line card of the first virtual client node and the corresponding line card of the first virtual core node, and
wherein the access interface within the second network device comprises a second abstracted fabric interface that provides a Layer-2 link between the corresponding line card of the second virtual client node and the corresponding line card of the second virtual core node.

11. The method of claim 9,
wherein the L2 circuit comprises a first L2 circuit,
wherein the access interface within the first network device comprises a first access interface within the first network device;
wherein the access interface within the second network device comprises a first access interface within the second network device;
wherein the first configuration data causes the first network device to configure a third virtual client node including a corresponding line card having a port connected to a third customer network device, and wherein the logical network comprises a first logical network, the method further comprising:
provisioning, by the first network device, a second access interface for a second L2 circuit to logically connect the third virtual client node and the first virtual core node across the first switch fabric, the first switch fabric interconnecting the corresponding line card of the third virtual client node and the corresponding line card of the first virtual core node, wherein the second L2 circuit provides connectivity between the third virtual client node and a fourth virtual client node within the second network device; and
forwarding, by the first network device and via the second L2 circuit, packets between the third virtual client node and the fourth virtual client node to realize a second logical network between the third customer network device and a fourth customer network device connected to the fourth virtual client node.

12. The method of claim 11, wherein the first L2 circuit is separate from the second L2 circuit.

13. The method of claim 11, wherein the first virtual client node is isolated from the third virtual client node.

14. A network device comprising:
one or more processors configured to:
receive configuration data to configure a plurality of virtual network nodes within the network device to operate as separate logical routers,
wherein the configuration data causes the network device to configure a virtual client node from the plurality of virtual network nodes including a corresponding line card that has a port connected to a first customer network device,
wherein the configuration data causes the network device to configure a virtual core node from the plurality of virtual network nodes including a corresponding line card that has a port connected to a core network that includes the network device;
provision an access interface within the network device for a Layer-2 (L2) circuit to logically connect the virtual client node and the virtual core node across a switch fabric interconnecting the corresponding line card of the virtual client node and the corresponding line card of the virtual core node, wherein the L2 circuit provides connectivity between the virtual client node and a remote client node of a remote network device; and
forward, via the L2 circuit, packets between the virtual client node and the remote client node to realize a logical network between the first customer network device and a second customer network device connected to the remote client node.

15. The network device of claim 14, wherein the remote client node comprises a remote virtual client node.

16. The network device of claim 14,
wherein the L2 circuit comprises a first L2 circuit,
wherein the access interface within the network device comprises a first access interface within the network device;
wherein the virtual client node comprises a first virtual client node, and wherein the configuration data causes the network device to configure a second virtual client node from the plurality of virtual network nodes including a corresponding line card that has a port connected to a third customer network device, the one or more processors further configured to:
provision a second access interface within the network device for a second L2 circuit to logically connect the second virtual client node and the virtual core node across the switch fabric, the switch fabric interconnecting the corresponding line card of the second virtual client node and the corresponding line card of the virtual core node, wherein the second L2 circuit provides connectivity between the second virtual client node and a second remote client node of the remote network device; and forward, via the second L2 circuit, packets between the second virtual client node and the second remote client node to realize a second logical network between the third customer network device and a fourth customer network device connected to the second remote client node.

17. The network device of claim 16, wherein the first L2 circuit is separate from the second L2 circuit.

18. The network device of claim 16, wherein the first virtual client node is isolated from the second virtual client node.

19. The network device of claim 14, wherein the access interface within the network device comprises an abstracted fabric interface that provides a Layer-2 link between one or more line cards the corresponding line card of the virtual client node and one or more line cards the corresponding line card of the virtual core node.

* * * * *

UNITED STATES PATENT AND TRADEMARK OFFICE
CERTIFICATE OF CORRECTION

| | |
|---|---|
| PATENT NO. | : 10,911,351 B2 |
| APPLICATION NO. | : 16/141530 |
| DATED | : February 2, 2021 |
| INVENTOR(S) | : Babu Singarayan et al. |

It is certified that error appears in the above-identified patent and that said Letters Patent is hereby corrected as shown below:

In the Claims

Column 20, Line 25 (Claim 5): replace "the interface within" with --the access interface within--
Column 23, Line 6 (Claim 16): replace "third customer network device and a fourth" with --third customer network device connected to the second virtual client node and a fourth--
Column 23, Line 17 (Claim 19): replace "between one or more line cards the corresponding line card of the virtual client node and one or more line cards the corresponding" with --between the corresponding line card of the virtual client node and the corresponding--

Signed and Sealed this
Sixth Day of June, 2023

Katherine Kelly Vidal
*Director of the United States Patent and Trademark Office*